United States Patent
Gilbert et al.

[19]

[11] Patent Number: 6,010,226
[45] Date of Patent: Jan. 4, 2000

[54] VEHICLE EXTERIOR MIRROR

[75] Inventors: Robert William Gilbert, Willunga; Garry Gordon Leslie Fimeri, Morphett Vale; Ingmar Manfred Birgden, Glenalta, all of Australia

[73] Assignee: Britax Rainsfords Pty. Limited, Lonsdale, Australia

[21] Appl. No.: 09/166,372

[22] Filed: Oct. 5, 1998

[30] Foreign Application Priority Data

Oct. 3, 1997 [GB] United Kingdom .................... 9720912

[51] Int. Cl.⁷ .............................. G02B 7/182; G02B 5/08
[52] U.S. Cl. ............................................ 359/872; 359/842
[58] Field of Search ................................... 359/841, 872, 359/842; 248/549, 900

[56] References Cited

U.S. PATENT DOCUMENTS

| | | | |
|---|---|---|---|
| 4,840,475 | 6/1989 | Herzog et al. ........................... | 359/841 |
| 5,099,362 | 3/1992 | Mittelhauser et al. ................... | 359/841 |

FOREIGN PATENT DOCUMENTS

| | | |
|---|---|---|
| 32 37 289 C2 | 10/1982 | Germany . |
| 33 07 532 A1 | 3/1983 | Germany . |
| 2 030 532 | 4/1980 | United Kingdom . |
| 2 047 185 | 11/1980 | United Kingdom . |
| 2 189 446 | 10/1987 | United Kingdom . |
| WO 87/06543 a1 | 11/1987 | WIPO . |

*Primary Examiner*—Cassandra Spyrou
*Assistant Examiner*—Jared Treas
*Attorney, Agent, or Firm*—Jones, Day, Reavis & Pogue

[57] ABSTRACT

A vehicle mirror comprises a mirror case (20), an intermediate member (38), a base member (18) secured to a vehicle, and a mirror case pivot assembly (56, 72) at one end of the intermediate member (38) pivotally connecting the intermediate member (38) to the mirror case (20) for relative angular movement about a first pivot axis. First and second rigid link (26, 42) have opposite ends pivotally connected to the base member (10) and to the opposite end of the intermediate member (38). The pivotal connections (28, 44) at the ends of the first and second rigid links (26, 42) nearer to the front of the vehicle are more widely spaced from each other than the pivotal connections (40, 52) at the other ends of the first and second links (26, 42).

11 Claims, 7 Drawing Sheets

VEHICLE EXTERIOR MIRROR

FIELD

This invention relates to a vehicle mirror of the type adapted to be mounted on a vehicle door or an adjacent part of a vehicle body, comprising an intermediate member having a first end pivotally connected by a mirror case pivot assembly to a mirror case for relative angular movement about a first pivot axis, and a second end pivotally connected by a base pivot assembly to a base member having an abutment face adapted to be secured to a vehicle.

RELATED ART

DE-C-3237289 discloses a mirror of this type in which the first pivot axis is located adjacent to the abutting faces of the base and mirror case and the second pivot axis is located closely adjacent to the rear edge thereof. In the event of impact on the mirror case from the front, the case pivots about the second pivot axis, the rear edge of the abutting face of the mirror case acting as a fulcrum. Similarly, in the event of impact from the rear, the mirror case pivots about the front pivot axis, the front edge of its abutting face acting as a fulcrum.

In order to avoid abrasion damage to the mirror case, use of edges thereof as fulcrums is undesirable, particularly when the mirror case has a painted finish. In practice, impact from the front is much more common than impact from the rear. In addition, when the mirror case is moved to a parked position in order to reduce the overall width of the vehicle, it is displaced rearwardly. Consequently there is a greater necessity to mitigate the risk of abrasion damage on rearward displacement.

U.S. Pat. No. 5009362 discloses a vehicle exterior mirror of the type described above, in which the pivotal connections between the base, the intermediate member and the case involve an arrangement of arcuate slots so that the mirror case pivots about virtual axes respectively in front of and behind the abutting faces of the base and the mirror case. This mirror is relatively complex. It is an object of the invention to provide a simpler mirror which pivots about such a vertical axis in the event of impact from the front.

SUMMARY OF THE INVENTION

According to the invention in one aspect, a vehicle mirror comprises a mirror case, an intermediate member having a first end and a second end, a base member having an abutment face adapted to be secured to a vehicle, a mirror case pivot assembly at the first end of the intermediate member pivotally connecting the intermediate member to the mirror case for relative angular movement about a first pivot axis, a first rigid link having a first end and a second end, a second rigid link having a first end and a second end, a first pivot joint pivotally connecting the first end of the first rigid link to the base member and having its pivot axis parallel to the pivot axis of the mirror case pivot assembly, a second pivot joint pivotally connecting the first end of the second rigid link to the base member at a distance further from the abutment surface of the base member than the distance of the first pivot joint from the abutment surface of the base member and having its pivot axis parallel to the pivot axis of the mirror case pivot assembly, a third pivot joint pivotally connecting the second end of the first rigid link to the intermediate member and having its pivot axis parallel to the pivot axis of the mirror case pivot assembly, and a fourth pivot joint pivotally connecting the second end of the second rigid link to the intermediate member at a distance from the mirror case pivot assembly less than the distance of the third pivot joint from the mirror case pivot assembly and having its pivot axis parallel to the pivot axis of the mirror case pivot assembly, wherein the pivot joints at the ends of the first and second rigid links nearer to the front of the vehicle when the mirror case is in its position of normal use are more widely spaced from each other than the pivot joints at the other ends of the first and second links.

According to the invention in another aspect, a vehicle mirror comprises a mirror case, an intermediate member having a first end and a second end which is pivotally connected to the base member, a base member having an abutment face adapted to be secured to a vehicle, a mirror case pivot assembly at the first end of the intermediate member pivotally connecting the intermediate member to the mirror case for relative angular movement about a first pivot axis, said pivot assembly comprising a pivot bearing engaging in an elongate slot so as to allow angular movement of the mirror case relative to the intermediate member about an axis perpendicular to the axis of the pivot bearing as well as about the axis of the pivot bearing, and spring means arranged to bias the pivot bearing to one end of the elongate slot.

DETAILED DESCRIPTION OF THE PREFERRED EMBODIMENT

Figure 1:
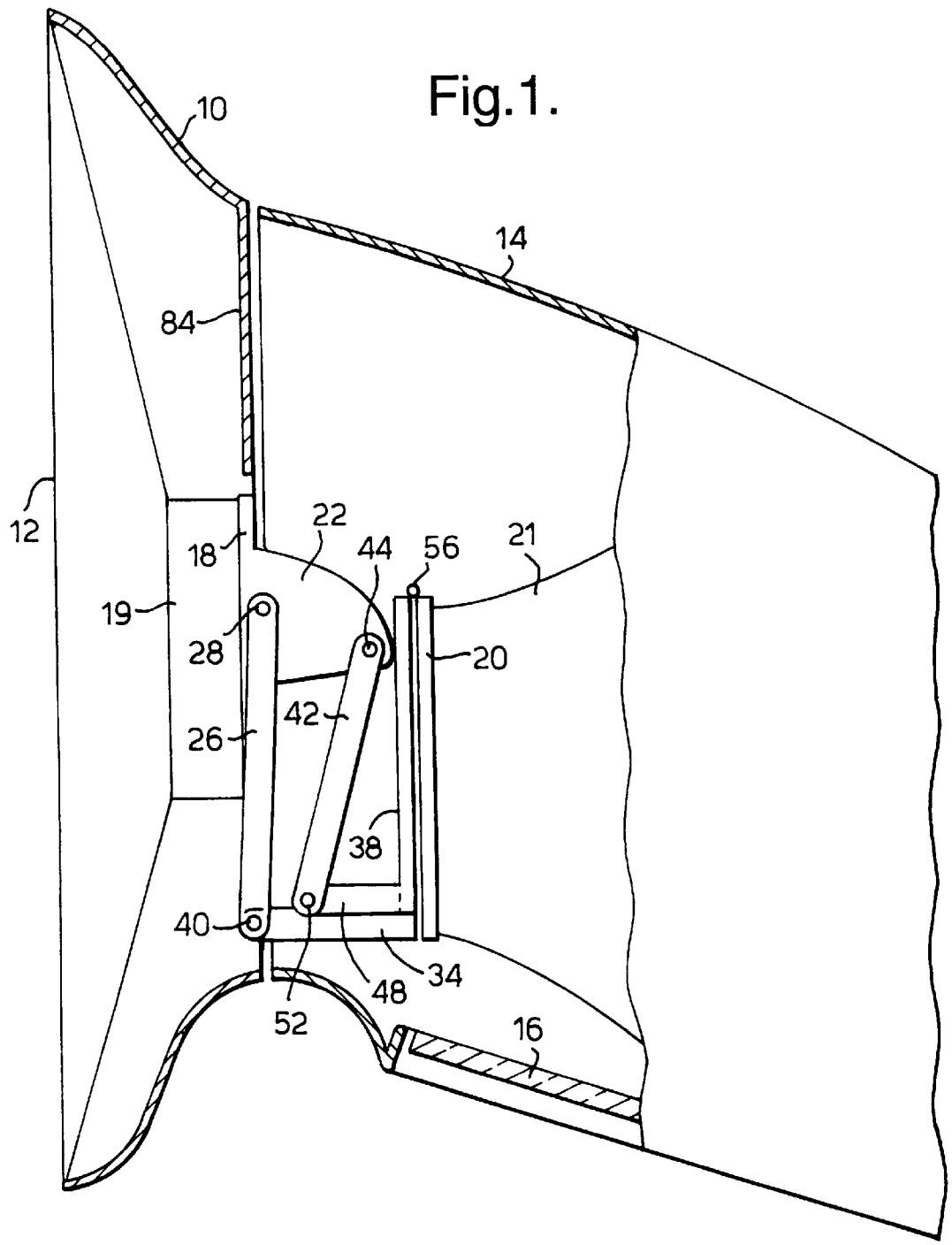
FIG. 1 is a partially cut-away plan view of a rear view mirror in accordance with the invention, in its normal position.

FIG. 1 shows a rear view mirror in accordance with the invention suitable for mounting on a right-hand side vehicle door. The mirror assembly comprises a base 10 having a surface 12 adapted to abut against the vehicle door, and a mirror case 14 containing a reflective member 16. The orientation of the reflective member 16 relative to the housing 14 can be adjusted by a standard mechanism (not shown).

The case 14 is connected to the base 10 by a hinge module having a base plate 18 secured to a frame member 19 within the base 10 and a case plate 20 secured to a frame member 21 within the mirror case 14. As can best be seen from FIG. 2, the base plate 18 has two projecting limbs 22 and 24 which extend between corresponding limbs of a yoke 26 and are coupled thereto by respective pivot pins 28 and 30. A central projection 32 of the yoke 26 is journalled between central projections 34 and 36 on an intermediate plate 38 by a pivot pin 40 which, in FIG. 1, is located inboard of the outer face of the base 10, the arms of the yoke 26 extending above and below the frame 19.

A clevis 42 also has its limbs pivotally connected to the projections 22 and 24 by respective pivot pins 44 and 46 which are located further from the base plate 18 than the pivot pins 28 and 30. The common part of the clevis 42 is pivotally connected to outer projections 48 and 50 on the intermediate plate 38 by respective pivot pins 52 and 54.

Figure 2:
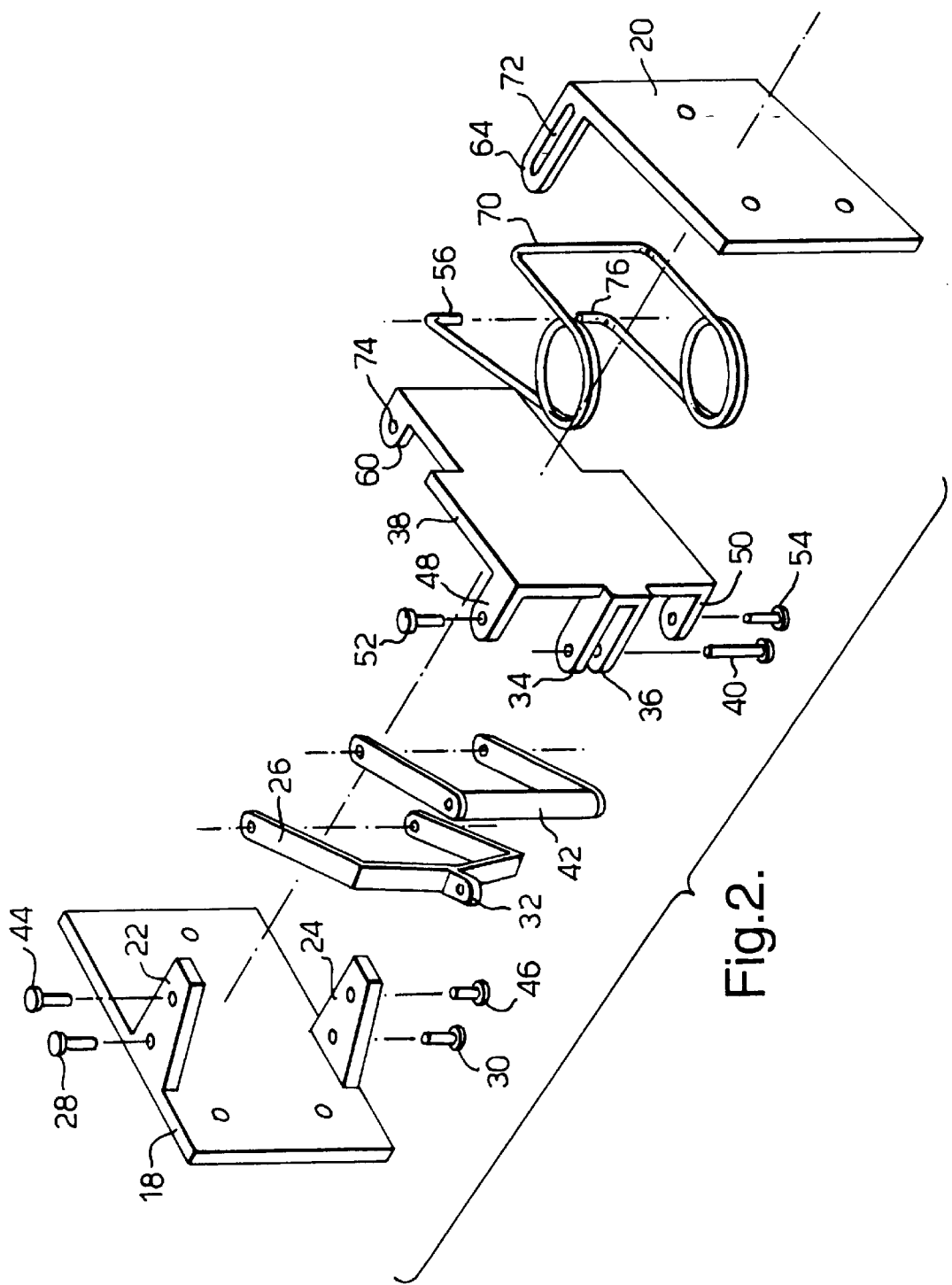
FIG. 2 is a perspective view of the mechanism connecting the case of the mirror shown in FIG. 1 to its base.
Figure 3:
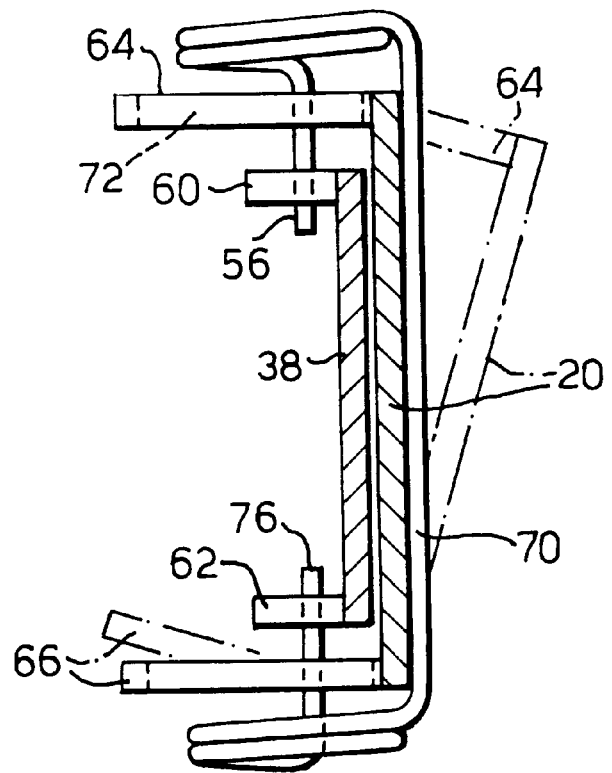
FIG. 3 is a scrap-sectional view of part of the mechanism shown in FIG. 2.

In FIG. 1, the case plate 20 is illustrated as connected to the end of the intermediate plate opposite to the projections 34 and 48 at a pivot axis 56. Details of this connection are shown in FIGS. 2 and 3. The intermediate plate 38 has upper and lower projections 60 and 62 which extend between elongate projections 64 and 66 on the case plate 20. A U-shaped wire spring 70 located between the intermediate plate 38 and the case plate 20 to bias these two plates towards one another. The upper limb of the spring 70 has a downwardly turned end portion 56 (equivalent to the pivot axis 56 of FIG. 1) which extends through an elongate slot 72 in the projection 64 on the case plate 20 and into a hole 74 on the projection 60 of the intermediate plate 38. The central part of the U-shaped spring 70 engages with the right-hand side (as viewed in FIGS. 2 and 3) of the case plate 20 so as to urge the case plate 20 into abutment with the intermediate plate 38, the end portion 56 of the spring 70 then being at the right-hand end of the slot 72 in the projection 64 and the end portion 76 of at the right-hand end of the corresponding slot in the projection 66.

Figure 4:
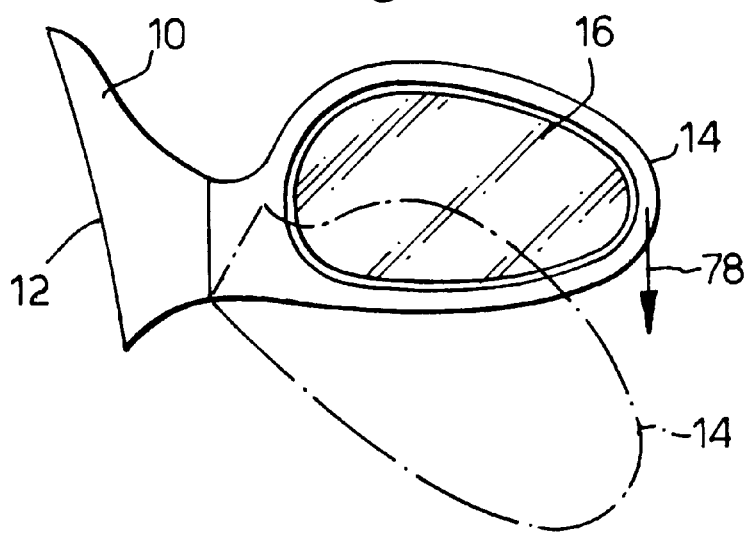
FIG. 4 is a view from the vehicle rear of the mirror shown in FIG. 1.

If a downward force is applied to the mirror case as represented by the arrow 78 in FIG. 4, for example because a passer-by rests a hand on it, the case plate 20 moves to the position shown in dotted lines in FIG. 3 as the case 14 moves to the position shown in dotted lines in FIG. 4. The end 56 of the spring 70 is then at the left-hand end of the slot 72. A corresponding movement can take place if the mirror case is subject to an upwardly displacing force. The vertical forces encountered in practice are not usually very large but the resilience provided by the spring 70 avoids the need to make the various components strong enough to absorb sudden vertical forces.

Figure 5:
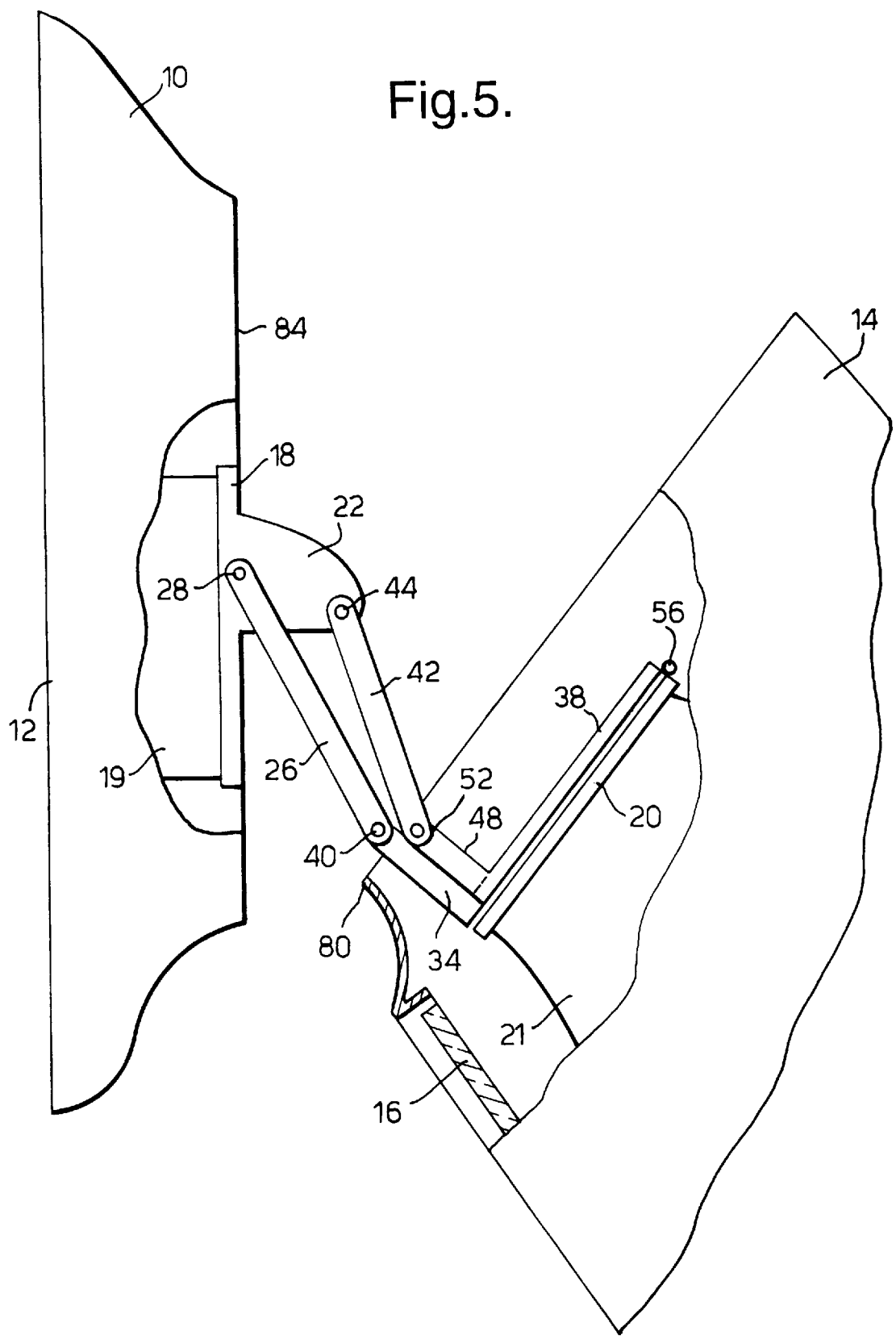
FIG. 5 is a plan view, similar to FIG. 1, but showing the mirror case partially displaced towards the rear.

Referring to FIG. 5, when the mirror case 14 is subject to a force tending to displace it rearwardly (due to either an impact or deliberate movement to a parked position), the mechanism initially pivots to the position shown in FIG. 5, in which the rear inboard edge 80 of the mirror case 14 is moved outwardly well clear of the base 10, the intermediate plate 38 moving relative to the baseplate 18 and the case plate 20 remaining in abutment with the intermediate plate 38. When the mirror case 14 is in its fully rearwardly displaced position, as illustrated in FIG. 6, there is no contact between the mirror case 14 and the base 10.

Figure 7:
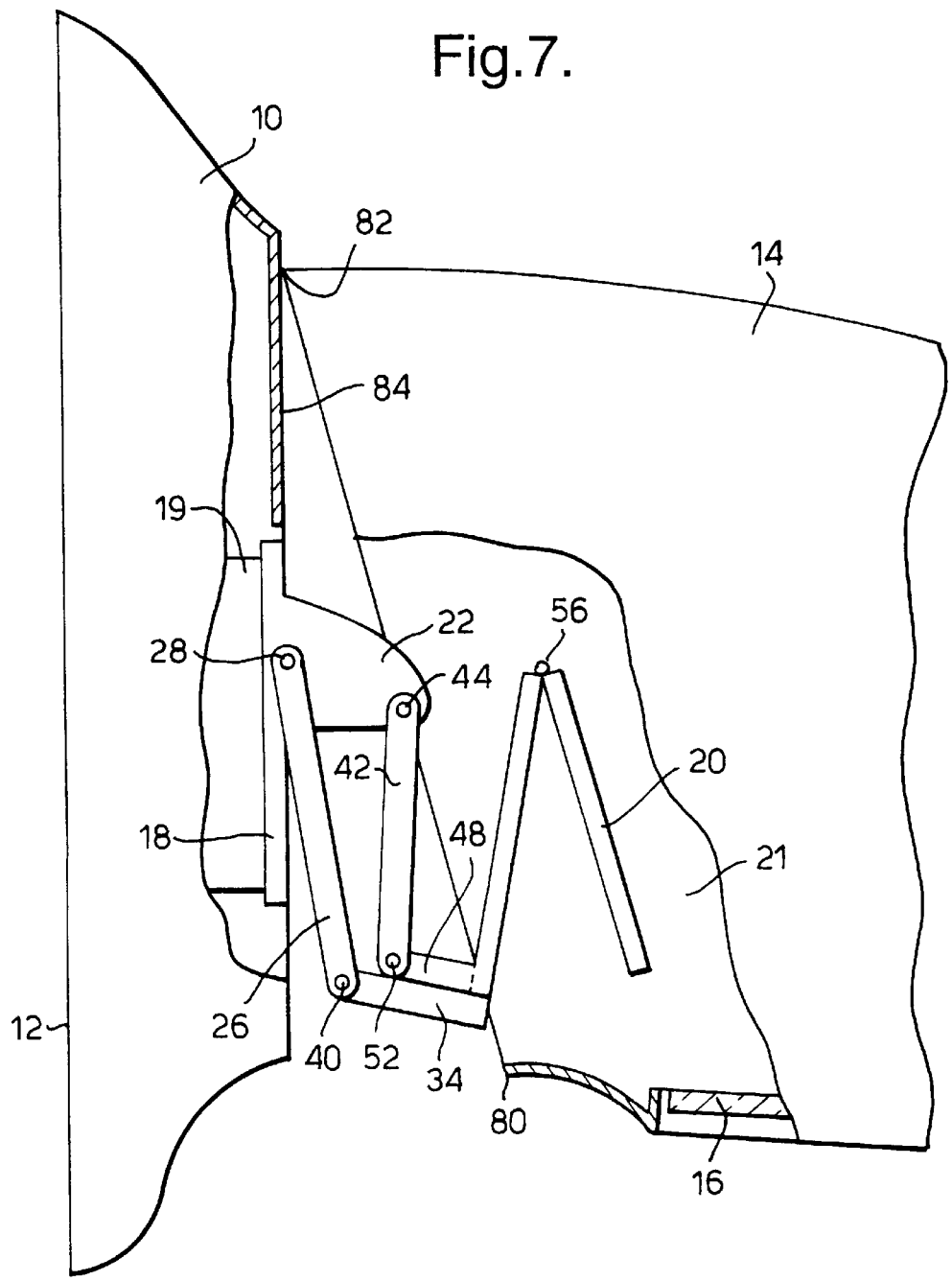
FIG. 7 is a plan view, similar to FIG. 1, but showing the mirror case partially displaced towards the front.

When the mirror case 14 is displaced towards the front, the front inboard corner 82 pivots on a surface 84 of the base 10, as illustrated in FIG. 7. To permit this movement, the case plate 20 pivots relative to the intermediate plate 38 about the spring ends 56 and 76 and the intermediate plate 38 moves relative to the baseplate 18.

The housing 14 is retained in its normal position by disengageable spring clips (not shown), for example as described in DE-A-3307532.

Figure 6:
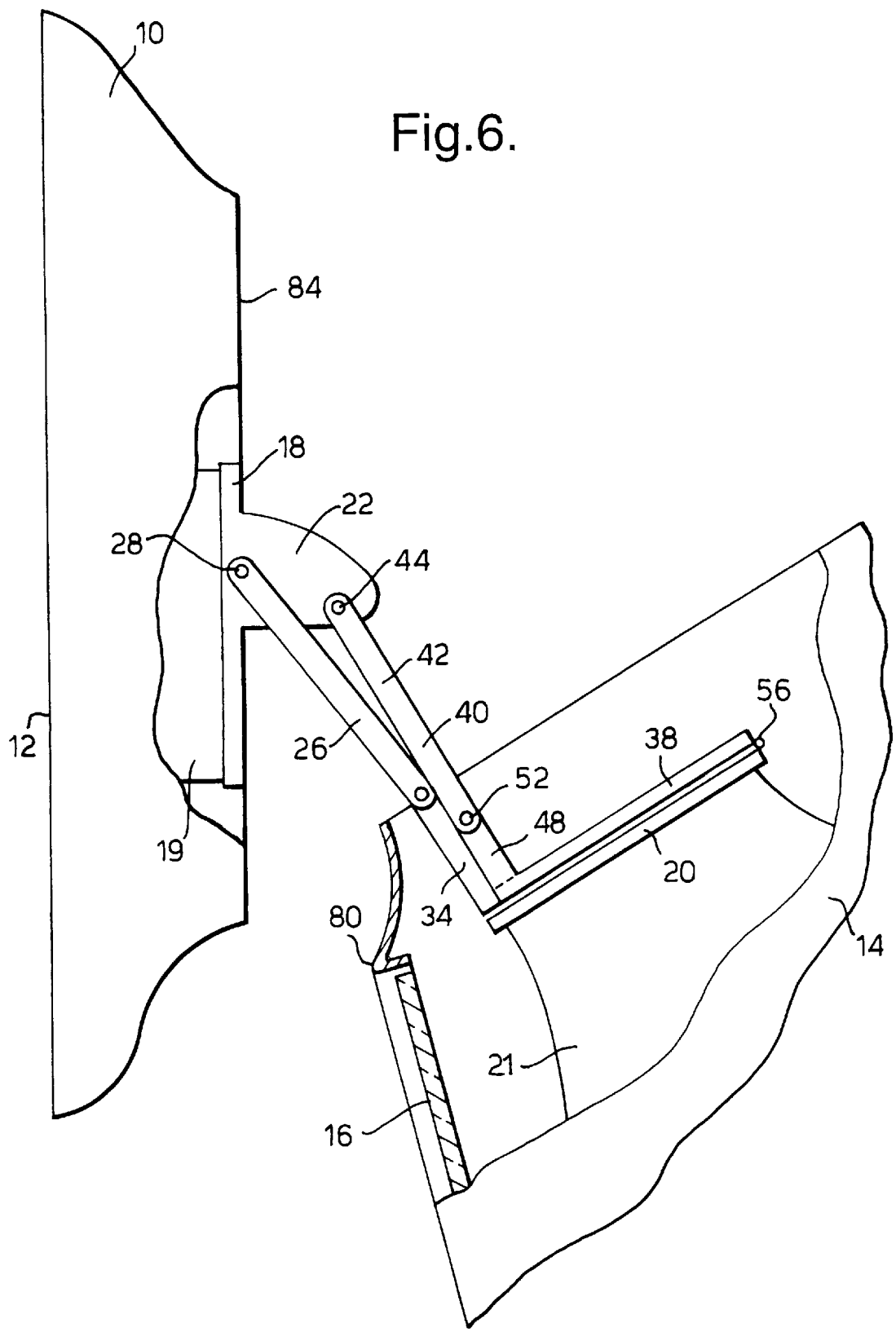
FIG. 6 is a plan view, similar to FIG. 5, but showing the mirror case fully displaced to the rear.
Figure 8:
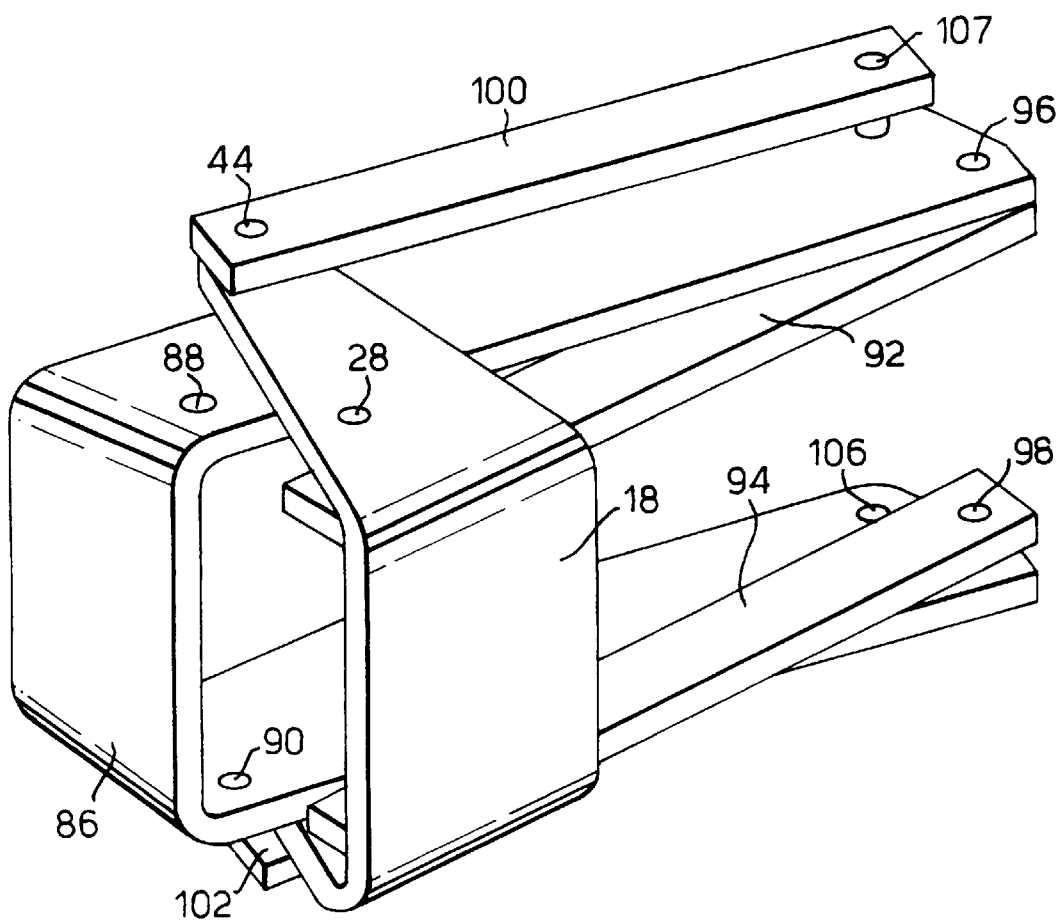
FIG. 8 is a perspective view of a modification to part of the mechanism shown in FIG. 2.

The mechanism described above does not allow the mirror head 14 to be displaced rearwardly further than is shown in FIG. 6 because the central projections 34 and 36 abut against the common part of the clevis 42. FIG. 8 shows a modified mechanism which is not subject to this limitation. The intermediate plate 38 of FIG. 2 is replaced by an intermediate plate 86 having holes 88 and 90 for receiving the spring ends 56 and 76 of FIG. 2. The yoke 26 of FIG. 2 is replaced by upper and lower long links 92 and 94 which are connected to the intermediate plate 86 by respective pivot pins 96 and 98. The clevis 42 of FIG. 2 is replaced by upper and lower long links 100 and 102 which are connected to the intermediate plate 86 by respective pivot pins 104 and 106.

What is claimed is:

1. A vehicle mirror comprising:
    a mirror case,
    a reflective member,
    an intermediate member independent of said reflective member and having a first end and a second end,
    a base member having an abutment face adapted to be secured to a vehicle,
    a mirror case pivot assembly at the first end of the intermediate member pivotally connecting the intermediate member to the mirror case for relative angular movement about a first pivot axis,
    a first rigid link having a first end and a second end,
    a second rigid link having a first end and a second end,
    a first pivot joint pivotally connecting the first end of the first rigid link to the base member and having its pivot axis parallel to the pivot axis of the mirror case pivot assembly,
    a second pivot joint pivotally connecting the first end of the second rigid link to the base member at a distance further from the abutment surface of the base member than the distance of the first pivot joint from the abutment surface of the base member and having its pivot axis parallel to the pivot axis of the mirror case pivot assembly,
    a third pivot joint pivotally connecting the second end of the first rigid link to the intermediate member and having its pivot axis parallel to the pivot axis of the mirror case pivot assembly, and
    a fourth pivot joint pivotally connecting the second end of the second rigid link to the intermediate member at a distance from the mirror case pivot assembly less than the distance of the third pivot joint from the mirror case pivot assembly and having its pivot axis parallel to the pivot axis of the mirror case pivot assembly,
    wherein the first and second pivot joints at the ends of the first and second rigid links nearer to the front of the vehicle when the mirror case is in its position of normal use are more widely spaced from each other than the third and fourth pivot joints at the other ends of the first and second links and the second and fourth pivot joints are spaced farther outwardly from said abutment face than said first and third pivot joints.

2. A vehicle mirror according to claim 1, wherein the second rigid link is shorter than the first rigid link.

3. A vehicle mirror according to claim 1 or 2, further comprising:
    a third rigid link spaced from and of the same length as the first rigid link, pivotally connected at a first end to the base member for relative angular movement about an axis coaxial with that of the first pivot joint and pivotally connected at a second end for relative angular movement about an axis coaxial with that of the third pivot joint, and
    a fourth rigid link spaced from and of the same length as the second link, pivotally connected at a first end to the base member for relative angular movement about an axis coaxial with that of the second pivot joint, and pivotally connected at a second end for relative angular movement about an axis coaxial with that of the fourth pivot joint.

4. A vehichle mirror according to claim 4, wherein the third rigid link is rigidly connected to the first rigid link and the second rigid link is rigidly connected to the fourth rigid link.

5. A vehicle mirror according to any preceding claim, wherein the pivotal connection between the intermediate member and the mirror case comprises pivot bearings engaging in elongated slots so as to allow angular movement of the mirror case relative to the intermediate member about an axis perpendicular to the axis of the pivot bearings by relative movement between the bearings and slots in a direction along the length of the slots as well as about the axis of the pivot bearings, and spring means arranged to bias the pivot bearings to one end of the elongate slots.

6. A vehicle mirror comprising:

a base member having an abutment face adapted to be secured to a vehicle, a mirror case, an intermediate member having a first end and a second end which is pivotally connected to the base member, a mirror case pivot assembly at the first end of the intermediate member pivotally connecting the intermediate member to the mirror case for relative angular movement about a first pivot axis, said pivot assembly comprising pivot bearings engaging in elongated slots so as to allow angular movement of the mirror case relative to the intermediate member about an axis perpendicular to the axis of the pivot bearings by relative movement between the bearings and slots in a direction along the length of the slots as well as about the axis of the pivot bearings, and spring means arranged to bias the pivot bearings to one end of the elongate slot.

7. A vehicle mirror according to claim 5 or 6, wherein the elongated slots are formed in the mirror case.

8. A vehicle mirror according to claim 5, 6 or 7, wherein the spring means comprises a wire spring having its ends aligned with one another and engaging in respective holes in the intermediate member and respective slots in the mirror case so as to constitute said pivot bearings.

9. In a vehicle rear view mirror assembly adapted for attachment externally to the side of a vehicle, said mirror assembly including a mounting base having a mirror case hingedly connected thereto by a pair of first and second links having link opposite end portions, said mirror case having a position of normal use relative to said base and an outwardly displaced position relative to said base, said mirror assembly in said position of normal use of said mirror case having said first and second links attached at one of said opposite end portions thereof to said base by first and second pivot connections and at the other of said opposite end portions thereof to said case by third and fourth pivot connections, said second link and said second and fourth pivot connections being located on the opposite side of said first link from said base, said first and second pivot connections being spaced-apart from one another a greater distance than the spacing between said third and fourth pivot connections, said mirror case being movable to said displaced position by rotation of said case about said third and fourth pivot connections along with rotation of said first and second links about said first and second pivot connections in a direction to provide movement of said third and fourth pivot connections outwardly away from said base, and said second link and said second and fourth pivot connections remaining on the opposite side of said first link from said base before, during and after movement of said case to said displaced position.

10. The mirror assembly of claim 9 wherein said second link is shorter than said first link and is inclined toward said first link and toward said base in a direction from said second pivot connection toward said fourth pivot connection.

11. In a vehicle rear view mirror assembly adapted for attachment externally to the side of a vehicle, said mirror assembly including a mounting base having a mirror case hingedly connected thereto by a pair of links having base end portions attached to said base by base pivot joints and opposite end portions attached to said case by case pivot joints, said mirror case having a position of normal use relative to said base in which said mirror case is located adjacent to said base and projects outwardly therefrom and a displaced position in which said mirror case is rotated relative to said base and is also displaced outwardly therefrom, said pair of links in both of said normal and displaced positions of said mirror case being in spaced-apart side-by-side nonparallel and noncrossing relationship to one another, said base pivot joints being spaced-apart from one another a greater distance than said case joints are spaced-apart from one another in both said normal and displaced positions of said mirror case, and said mirror case being rotatable about said case pivot joints and said links being rotatable about said base pivot joints to move said mirror case and said case pivot joints outwardly away from said base as said mirror case moves from said normal position to said displaced position.

\* \* \* \* \*